United States Patent Office 3,525,101
Patented Aug. 18, 1970

3,525,101
METHOD FOR THE PREPARATION OF NITRILES
Howard S. Young and Jefferson Wayne Reynolds, Kingsport, Tenn., assignors to Eastman Kodak Company, Rochester, N.Y., a corporation of New Jersey
No Drawing. Filed Dec. 6, 1967, Ser. No. 688,360
Int. Cl. C07c *121/02, 121/03*
U.S. Cl. 260—465.3                                        5 Claims

ABSTRACT OF THE DISCLOSURE

Novel catalyst composition comprising molybdenum and at least one of oxidized niobium and oxidized tantalum carried on a solid preformed, microporous, support, such as silica or silica-alumina, which has pores of about 80 to about 280 A. in diameter. Optionally, oxidized arsenic is included as one of the catalyst components. Method for preparing catalyst composition comprising two step impregnation of preformed support having pores of about 80 to about 280 A. in diameter with aqueous solutions of niobium or tantalum and molybdenum compounds. Water is evaporated from the composition at low temperatures and the niobium or tantalum and molybdenum compounds are decomposed by first drying at a temperature of 110–200° C. and then calcining at 250–450° C. Method of oxidatively converting propylene to acrylic acid or acrylonitrile comprising passing propylene (with ammonia to obtain acrylonitrile) over a catalyst composition comprising oxidized molybdenum, niobium or tantalum and optionally arsenic carried on a solid, preformed, microporous support having pores of about 80 to about 280 A. in diameter.

---

This invention relates to novel catalyst supports having pores within a certain size range. More particularly, the invention concerns novel catalyst compositions comprising oxidized molybdenum, niobium or tantalum and optionally arsenic carried on a support, such as silica or silica-alumina having a major portion of its pores of 80–280 A. in diameter. The invention also concerns the method of preparing the catalyst compositions and a method of preparing acrylic acid or acrylonitrile from propylene employing the present catalyst composition.

It is known that certain alpha-beta-unsaturated olefins such as propylene are converted to the corresponding alpha,beta-unsaturated acids by catalytic oxidation of the olefin to the acid in the presence of certain coprecipitated catalyst. Furthermore, it is also known that certain alpha, beta-unsaturated olefins such as propylene are converted to the corresponding nitrile by catalytic oxidation of the olefin in the presence of certain catalysts and ammonia. However, none of the prior art discloses the use of the supports of this invention for the preparation of the oxidation catalyst. Moreover, none of the art suggests the surprising improved results obtained from the use of these supports.

Accordingly, it is an object of this invention to provide novel catalyst compositions which are prepared in high yields by an inexpensive and simple method.

Another object of this invention is the provision of a catalyst composition which is surprisingly effective in oxidation and ammoxidation reactions.

A further object of this invention is the provision of a catalyst composition which is unexpectedly long lasting in life.

These and other objects, features and advantages of the present invention will become apparent from a consideration of the following detailed description.

When oxidatively converting propylene to acrylic acid or acrylonitrile in the vapor phase, certain specific supported catalyst compositions have been found to be effective in producing good conversions and yields. Supports for these catalyst compositions conventionally have pores within the range of 10 to 500 A. in diameter. It has now been unexpectedly discovered that by supporting the catalyst composition on a support having a major portion of its pores within the range of 80 to 280 A. in diameter, superior conversions and yields are obtained. Furthermore, it has been discovered that by employing a support having a major portion of its pores within the range of about 100 to about 200 A. in diameter, particularly superior results are obtained. The most superior results are obtained through the use of a support having a major portion of its pores within the range of about 120 to about 180 A. in diameter. The pore structure and other related properties of several supports usable in the preparation of the present catalyst compositions are listed below. Surface area of the pores within the indicated diameter range is calculated from total surface area of the pores and the percentage surface area of pores in that diameter range. From the surface area in a particular pore diameter range, pore volume in the same diameter range is calculated by the following equation:

$$V = \frac{\bar{d}A}{4 \times 10^4}$$

where V is pore volume in cc. per gram, $\bar{d}$ is the average pore diameter in the range expressed by angstroms (A.), and A is surface area in the pore diameter range expressed in square meters per gram.

(1) Support No. 1—Davison grade 62 silica gel

Surface area—(meters)²/g. _____ 301
Pore volume—cc./g. _____ 1.12
Average pore diameter—A. _____ 149
Median pore diameter—A. _____ 157
Width of distribution—A. _____ 55

| Diameter range, A. | $\bar{d}$, A. | Percent area | M.²/g. | V, cc./g. |
|---|---|---|---|---|
| <40 | | 0.0 | 0.0 | 0.0 |
| 40–80 | 60 | 5.5 | 16.5 | 0.025 |
| 80–110 | 95 | 7.6 | 22.8 | 0.054 |
| 110–140 | 125 | 14.5 | 43.7 | 0.136 |
| 140–180 | 160 | 59.9 | 180.2 | 0.721 |
| 180–220 | 200 | 8.9 | 26.8 | 0.129 |
| 220–260 | 240 | 1.7 | 5.1 | 0.036 |
| 260–360 | 310 | 1.9 | 5.7 | 0.044 |
| 360+ | | 0 | 0 | 0 |
| Total | | | 300.8 | 1.145 |

(2) Support No. 2—Davison microspheroidal silica-alumina (13% alumina)

After activation 3 hours at 1000° F.
Surface area—(meters) ²/g. _____ 575
Port volume—cc./g. _____ 0.74
Average pore diameter—A. _____ 51

| Diameter range, A. | $\bar{d}$, A. | Percent area | M.²/g. | V, cc./g. |
|---|---|---|---|---|
| 20–30 | 25 | 6.24 | 35.9 | 0.022 |
| 30–40 | 35 | 22.93 | 131.9 | 0.115 |
| 40–50 | 45 | 25.01 | 143.9 | 0.162 |
| 50–60 | 55 | 22.48 | 129.3 | 0.178 |
| 60–70 | 65 | 13.10 | 75.3 | 0.122 |
| 70–80 | 75 | 6.18 | 35.6 | 0.067 |
| 80–100 | 85 | 2.96 | 17.0 | 0.038 |
| 100 plus | | 1.10 | 6.3 | ¹ (0.039) |

¹ By difference.

(3) Support No. 3—Davison grade 12 granular silica

Surface area—(meters)²/g. _____ 800
Pore volume—cc./g. _____ 0.43
Average pore diameter—A. _____ 22.4
Mesh size 28 x 200.

(4) Support No. 4—Davison grade 952 silica gel

Surface area—(meters)²/g. _____ 355
Pore volume—cc./g. _____ 1.92
Average pore diameter—A. _____ 216
Median pore diameter—A. _____ 220
Width of distribution—A. _____ 106

| Diameter range, A. | $\bar{d}$, A. | Percent area | M.²/g. | V, cc./g. |
|---|---|---|---|---|
| <120 | | 0.0 | 0.0 | 0.0 |
| 120–200 | 160 | 43.5 | 154.2 | 0.616 |
| 200–300 | 250 | 49.6 | 176.0 | 1.099 |
| 300–400 | 350 | 6.3 | 22.4 | 0.196 |
| 400–500 | 450 | 0.6 | 2.1 | 0.024 |
| 500–600 | | 0.0 | 0.0 | 0.0 |
| Total | | | 354.7 | 1.935 |

(5) Support No. 5—Davison granular SMR 7–1032A silica gel

Surface area—(meters)²/g. _____ 232
Pore volume—cc./g. _____ 1.41
Average pore diameter—A. _____ 243
Median pore diameter—A. _____ 199
Width of distribution—A. _____ 151

| Diameter range, A. | $\bar{d}$, A. | Percent area | M.²/g. | V, cc./g. |
|---|---|---|---|---|
| <150 | | 0.0 | 0.0 | 0.0 |
| 150–200 | 175 | 50.5 | 117.0 | 0.513 |
| 200–300 | 250 | 27.6 | 63.9 | 0.399 |
| 300–400 | 350 | 19.1 | 44.3 | 0.388 |
| 400–500 | 450 | 2.7 | 6.3 | 0.071 |
| 500–600 | 550 | 0.1 | 0.2 | 0.003 |
| Total | | | 231.7 | 1.374 |

(6) Support No. 6—Davison grade 56 silica gel

Surface area—(meters)²/g. _____ 258
Pore volume—cc./g. _____ 1.35
Average pore diameter—A. _____ 209
Median pore diameter—A. _____ 175
Width of distribution—A. _____ 81

| Diameter range, A. | $\bar{d}$, A. | Percent area | M.²/g. | V, cc./g. |
|---|---|---|---|---|
| <100 | | 0.0 | 0.0 | 0.0 |
| 100–200 | 150 | 77.0 | 198.5 | 0.745 |
| 200–300 | 250 | 20.1 | 51.9 | 0.324 |
| 300–400 | 350 | 2.9 | 7.5 | 0.066 |
| 400–500 | 450 | 0.0 | 0.0 | 0.0 |
| 500–600 | 550 | 0.0 | 0.0 | 0.0 |
| Total | | | 257.9 | 1.135 |

Active and selective catalyst compositions of oxidized molybdenum, niobium, or tantalum and optionally arsenic produce surprisingly improved results when carried on the novel supports of this application. Because of the highly reactive nature of the vapor phase mixture containing oxygen and propylene in the presence of a catalyst at elevated temperatures, the exact structure of the catalyst is uncertain. The catalyst may be a mixture of one or more oxides or salts of molybdenum in admixture with one or more oxides or salts of niobium and/or tantalum. Furthermore, when arsenic is present, its structure is uncertain, being one or more oxides or salts thereof. It may also be that the total catalyst composition is a substantially homogeneous micromixture of loose chemical combinations of oxides of molybdenum and oxides of niobium and/or tantalum together with oxides of arsenic. It is most likely that the catalyst exists in both conditions with oxides or salts of molybdenum, niobium, tantalum and arsenic as well as the various loose chemical combinations of oxides of molybdenum, niobium, tantalum and arsenic. In any event, it is known that the catalyst composition does contain materials in an oxidized state, i.e., the materials have an increased oxidation state (positive valence) in which the atoms have lost one or more electrons.

As aforesaid, the arsenic, molybdenum, tantalum and niobium components of the catalysts are in oxidized states. By this it is meant that these components are in states in the catalyst which are attained by either direct oxidation of the individual components with or without the support, or by calcination of mixtures of the components with or without the support.

Among the preferred compounds of molybdenum suitable for use in these catalysts are molybdic acid, molybdenum compounds prepared by dissolving molybdenum trioxide or molybdic acid in aqueous solutions of citric, tartaric, lactic and oxalic acids, and the soluble molybdenum heteropoly acids such as cerimolybdic acid, silicomolybdic acid and chromimolybdic acid, and salts of these acids. Examples of specific useful salts are ammonium heptomolybdate, ammonium molybdate, ammonium hexamolybdochromiate and ammonium dodecamolybdocerate. Small amounts of metals other than the molybdenum, niobium and tantalum may also be included in the catalyst composition.

The heteropoly acids, or their ammonium salts, are characterized by each member containing a complex and high-molecular-weight anion. These anions contain a central element and at least one coordinating element as well as oxygen. In the present case cerium, silicon, or chromium, etc. serves as the central element. Molybdenum serves as the coordinating element. The central atom, or heteroatom, is normally at the center of an $XO_4$ tetrahedron or an $XO_6$ octahedron. Coordinating atoms of molybdenum are at the center of $MoO_6$ octahedra. These octahedra coordinate about the central atom, sharing oxygen atoms, to yield the heteropoly anion. Hydrogen ions, or cations such as ammonium, as well as molecules of water of hydration, are associated with the complex anion.

Molybdenum may also be supplied to the catalyst in the form of ammonium heptamolybdate or molybdenum trioxide. The ammonium heptamolybdate is quite useful in its commercially available form while the molybdenum trioxide should be dissolved in ammonium hydroxide prior to incorporation into the catalyst composition. It is believed that during the calcination of the catalyst the molybdenum component, whatever its initial form, is ultimately converted at least in part to a form of molybdenum trioxide or some complex thereof. This speculation, however, should not be interpreted as a limitation of the scope of this invention. A further discussion of this matter is presented in a later portion of this specification.

The arsenic component of the catalyst may consist of one or more different compounds of arsenic such as elemental arsenic, arsenic (III) oxide, arsenic (V) oxide. The preferable forms of arsenic are the oxides, and arsenic (III) oxide is particularly preferred because of its cheapness and effectiveness. These arsenic compounds are incorporated into the catalysts in any one of several different ways as will be described in a later portion of this specification.

A further component of the catalyst is a compound of tantalum or niobium in oxidized states or a mixture of compounds of one or both of these elements. It is desirable that this component be incorporated into the catalyst preparation in a reactive or soluble form. Niobium pentoxide, when freshly precipitated from an aqueous solution is initially a reactive hydrous oxide, and is quite useful, but on standing some hours it apparently polymerizes to a considerable degree, yielding a much less reactive species. A particularly effective form of niobium or tantalum is the oxalate, which in each case is readily soluble in a water solution which contains a low concentration of oxalic acid. Other forms of these elements, such as the halides or freshly precipitated oxides or complex organic derivatives such as the lactates, tartrates, or citrates may also be used in preparing the catalyst compositions of our invention. It is believed that under the conditions of catalyst preparation these materials are converted at least in part to niobium or tantalum pentoxides, or complexes thereof, but this speculation should not be construed so as to limit in any way the scope of our invention.

As pointed out hereinbefore, the exact composition of the catalyst at the time the reaction occurs is not known with certainty. However, when the molybdenum content of the catalyst is reported as $MoO_3$, the niobium content of the catalyst is reported at $Nb_2O_5$, the tantalum content of the catalyst is reported as $Ta_2O_5$, the arsenic content is reported as $As_2O_3$, and the central element contents of the heteropoly acid or its ammonium salt such as cerium, silicon, or chromium are reported as $CeO_2$, $SiO_2$, and $Cr_2O_3$, the broad, preferred and most preferred limits for the catalyst composition on a weight percent basis are as follows:

CATALYST COMPOSITIONS, WT. PERCENT

| Expressed as component | Broad | Preferred | Most preferred |
|---|---|---|---|
| $MoO_3$ | 5-75 | 10-40 | 20-36 |
| $Nb_2O_5$ and/or $Ta_2O_5$ | 2-50 | 5-30 | 10-15 |
| $CeO_2$, $SiO_2$, or $Cr_2O_3$ | 0-7.5 | 0-5.0 | 0 |
| $As_2O_3$ | 0-25 | 5-15 | 4-10 |
| Support | 50-90 | 50-80 | 50-66 |

METHOD OF CATALYST PREPARATION

The catalysts of the invention are prepared by any of several suitable methods. For example, the molybdenum component in any of its previously described forms and aqueous niobium oxalate or tantalum oxalate may be used in solution to impregnate the supports in a two step process with a drying step between the two impregnations. Preferably, a solution of molybdenum compound is used in the first impregnation and a solution of niobium or tantalum compound is used in the second impregnation. Water is evaporated from the preparation at a low temperature and the niobium or tantalum and molybdenum compounds are decomposed by first drying at a temperature of 110–200° C. and then calcining at 250–500° C. During the drying process, particularly at the higher temperature, the material containing niobium turns green, which is believed to be indicatve of the formaton of a compound containing niobium and molybdenum. The formation of a green compound between certain niobium and molybdenum compounds has been established by X-ray analysis. This same green compound has been found in compositions prepared from silica sol, niobium oxalate, and ammonium heptamolybdate.

Alternatively, the catalyst is prepared by impregnating the support with a solution of the molybdenum component and a niobium or tantalum oxalate. The catalyst is then dried, calcined, and charged to a reactor. Following these steps, arsenic is added to the catalyst as will be described hereinafter.

While it is frequently preferable, as is well known to those skilled in the art, to calcine a catalyst preparation prior to charging the catalyst to the reactor, the catalyst of this invention may also be prepared and charged to the reactor before calcination. Calcination is then accomplished by heating the catalyst to an elevated temperature for a sufficient length of time prior to performing the subject process. This mode of catalyst preparation is usuable whether or not arsenic is present in the catalyst composition at this point. If arsenic is absent from the preparation, it may be added before, during or after calcination, as described hereinafter.

When the arsenic component is initially omitted from the catalyst preparation, there are several methods available for the ultimate addition of the arsenic. A particularly preferred method is to charge the arsenic-free catalyst to a reactor, heat the catalyst to temperatures on the order of 150° to 450° C. and then pass a gaseous stream such as air containing a volatile form of arsenic through the heated catalyst bed. Thus, arsenic (III) oxide vapors are passed through the catalyst bed for a time sufficient to generate the desired content in the catalyst.

Another preferred method involves the bulk addition of a volatile arsenic compound such as arsenic (III) oxide to the catalyst composition followed by heating the composition at temperatures of 150–450° C. while passing a gas such as air through the composition at low linear velocities to aid in absorption of the arsenic oxide. This latter mode of operation is particularly preferred with fluid-bed catalyst systems.

During use of these arsenic-containing catalysts, volatile compounds of arsenic, notably arsenic (III) oxide, are slowly evolved from the material and are carried away from the catalyst in the product stream. In order to offset this continual loss, arsenic may be added to the catalyst during use, either continuously or discontinuously, so that a given level of arsenic content is maintained in the reaction zone. A particularly effective method of maintaining the desired concentration of arsenic is to pass a portion of the feed stream containing olefin and oxygen over a bed of a volatile arsenic compound such as elemental arsenic or arsenic (III) oxide maintained at suitably elevated temperature. This suitably elevated temperature is chosen so that a desired partial pressure of the compound is maintained in the feed to the catalyst. Alternatively, a compound of arsenic (III) oxide or arsenic (V) oxide may be added to the catalyst either continuously or at intervals, as, for example, by a suitable solids feeder.

When calcining the catalysts of the present invention, temperatures in excess of 600° C. should be avoided since they tend to decrease the ultimate catalytic activity of the composition.

The catalysts of this invention may be regenerated at intervals if necessary by passing an oxidizing gaseous mixture over the catalyst at elevated temperatures. Air or air diluted with flue gas or steam is an excellent agent for such regeneration.

The result of an attrition resistance test is also provided in the examples of this application. Those results are obtained from the following apparatus. The part of the apparatus used to hold 50 g. of sized, fluid-bed catalyst consists of a 1.5″ I.D. x 27.5″ section attached below a larger 5″ I.D. x 18″ section through a 4″ long conical section, all made from stainless steel. Air at 15 cubic feet per hour is admitted through precision 1/16″ holes in a perforated plate at the bottom of the vertically mounted 1.5″ diameter section to cause jets of catalyst to be blown upward at a fairly high velocity. The large section allows the particles with diameters over approximately 16 microns (depending somewhat on density of particle and governed by Stokes law) to fall back and concentrate on the outer walls of the 5″ diameter section. Particles with diameters under 16 microns are carried over into a 500 ml. Pyrex collector flask containing an extraction thimble for filtration and weighed at intervals to determine the amount of fines formed as a function of time. A control sample of commercial silica-alumina cracking catalyst was run at frequent intervals and was found to give approximately 10% overheat in 24 hours.

The catalyst composition of the present invention is quite effective in oxidatively converting propylene to acrylic acid or ammonia and propylene to acrylonitrile by the following respective equations:

$$2CH_2\!=\!CH\!-\!CH_3 + 3O_2 \xrightarrow{\text{catalyst}} 2CH_2\!=\!CH\!-\!CO_2H + 2H_2O$$
$$\text{Acrylic Acid}$$

$$2NH_3 + 3O_2 + 2CH_2\!=\!CH\!-\!CH_3 \xrightarrow{\text{catalyst}} 2CH_2\!=\!CH\!-\!CN + 6H_2O$$
$$\text{Acrylonitrile}$$

The oxygen employed in the present process may be derived from any suitable source such as pure oxygen or mixtures of oxygen with inert gases such as nitrogen, $CO_2$, or flue gas. Air is an especially preferred source of oxygen since it is so inexpensive and easily obtainable. In addition, nitrogen in the air serves as a diluent for the feed stream.

In the synthesis of acrylic acid, propylene to oxygen ratios of 1:0.5 to 1:10 are operable, ratios of 1:0.6 to 1:3 are preferred, and ratios of 1:0.8 to 1:1.6 are most preferred. Thus, if air is the source of oxygen, propylene to air ratios of 1:2.85 to 1:14.3 are preferred. In the synthesis of acrylonitrile, the source of oxygen may be air or oxygen in admixture with nitrogen, flue gas, steam, or carbon dioxide. The oxygen to propylene ratio may be varied from the stoichiometric 1.5:1 mole ratio; values from about 0.5:1 to 5:1 may be used, although ratios ranging from a value of about 0.5:1 up to about 4:1 are preferred, and ratios from about 1:1 to 3:1 are most preferred. The ammonia to propylene ratio may be varied from the stoichiometric 1:1 mole ratio. An operable propylene to ammonia ratio range is from 0.2:1 to 2:1, preferred ranges of ammonia to propylene mole ratio are 0.5:1 to 1.5:1, and most preferred are 0.7:1 to 1:1. In particular, the ratio may be less than 1:1 with little, if any, adverse effect on conversion of propylene to acrylontrile, but with considerable economy in ammonia costs. There is no evident advantage in using ammonia to propylene mole ratios substantially greater than 1:1. In addition, the feed stream preferably contains up to 5 moles of steam per mole of propylene. The reaction, however, does not require the presence of steam and produces adequate results with no steam being fed.

The olefins used in the process of this invention are flammable compounds, and therefore it may be a desirable practice to avoid feeding flammable mixtures. This can be done in one of several ways, such as by controlling the ratio of olefin to oxygen or by adding an inert diluent such as nitrogen or $CO_2$. Another technique for suppressing flammability is the addition of a flammable diluent such as one or more of the lower alkanes. Thus, propane, ethane or methane might be added to render the feed mixture less flammable. As is known to those skilled in art, the use of fluid-bed catalysts also aids materially in decreasing the hazards of explosion.

The temperature maintained during the reaction is variable within limits of about 300 to about 550° C. For acrylic acid temperatures of 325–450° C. are preferred and temperatures of 370–425° C. are most preferred. For acrylonitrile, temperatures of 350–525° C. are preferred and temperature of 400–500° C. are most preferred. The reaction is not significantly pressure dependent, and therefore, the choice of operating pressures is generally governed by economic considerations. However, pressures ranging from about 1 to about 5 atmospheres are preferred, with higher pressures being operable.

The contact time chosen in a function of several variables, including reaction temperature, composition of catalyst, and type of reactor. The levels chosen for these variables enable one to strike a balance among conversion, yield, and productivity. It will be appreciated by those skilled in the art that under certain conditions the type of reactor predetermines the range of contact times. Thus, in a fluid-bed reactor the linear velocity of the feed stream must be approximately above the minimum fluidization velocity of the catalyst bed and below the terminal velocity of the smaller particles, or velocity at which these particles are removed from the fluidized bed by entrainment. Contact time is defined as the average time, at reaction conditions, which the reactants spend in a volume equal to that of the bulk catalyst bed, assuming ideal behavior of the feed gases. Contact times of 0.1 to 20 seconds may be used with good results, but contact times of 0.5 to 10 seconds are preferred, and 1 to 5 seconds are most preferred.

The percent conversion of olefin to a specified $$\text{product} = \frac{\text{moles product formed} \times 100}{\text{moles olefin fed}}$$

and the percent yield of the specified $$\text{product} = \frac{\text{moles product formed} \times 100}{\text{moles olefin consumed}}$$

The above mentioned novel oxidation catalysts of the present invention are solids which can be employed in the process in the form of granules, pellets, powders, and the like. Since the oxidation of olefins to unsaturated acids and aldehydes is highly exothermic, it is preferable to employ the catalysts in the form of a solid supported catalyst bed which is "fluidized" by the upward flow of the vapor phase reaction mixture therethrough. The use of such a fluidized bed clearly facilitates control of the reaction temperature as is well known to those skilled in the art. Particle sizes for the supports to be used in the fluid-bed may range preferably between U.S. Standard Sieves 30 and 250, with particle sizes ranging between sieves 50 and 200 being especially preferred.

The population or total concentration of pores on the support as well as the pore-size distribution is an important factor contributing to the unexpected advantages obtained from the use of these novel materials. In other words, one could have a relatively nonporous support unsuitable for use in the processes of this invention which has most of its pores in the desired pore-size range. It is, therefore, necessary to establish the limits of total pore volume as being from about 0.4 to about 2.0 ml. per gram of support. A total pore volume from about 1.0 to about 1.5 ml. per gram is particularly desirable.

A more complete understanding of the invention will be obtained from the following examples. The percentages of catalyst compounds are given using the oxide forms of the components for designation purposes only. The use of these terms should not be interpreted as an indication of the state of these components during the reaction phase of the process. It should be noted that useful conversions are obtained from supports with pore sizes ranging from about 20 to about 400 A. in diameter. Supports (such as in Examples 2 and 4 through 12) having most pores in the diameter range of about 80 to about 280 A. give particularly good results and high conversions.

EXAMPLE 1

Davison grade 12 silica described above is used to prepare a material having a calculated composition of 6.8% $Nb_2O_5$, 14.7% $MoO_3$, and 78.5% $SiO_2$. This is treated with arsenic trioxide in a Vycor glass reactor and tested in the synthesis of acrylic acid from propylene. To prepare the $Nb_2O_5$-$MoO_3$-$SiO_2$, a quantity of 458 g. (444.2 g. on a dry basis) of the silica (28 x 200 mesh) is impregnated in a Coors evaporating dish with 400 ml. of an aqueous solution containing niobium and molybdenum oxalates equivalent to 19.2 g. of $Nb_2O_5$ and 41.6 g. of $MoO_3$. The amount of solution barely wets the silica. The material is stirred thoroughly, soaked 1 hr. and then dried on a hot plate as described in Example 3. The impregnation is repeated with a second 400 ml. portion of the mixed oxalate solution and heated to 150° C. again while stirring. A total of 604.4 g. of black, partially dry material is obtained at this point. On screening, 358.2 g. of material is retained between U.S. Standard Sieves 50 and 200. This material is calcined 2 hrs. at 250° C. and then 4 hrs. in a muffle furnace at 450° C. The resulting light green material weighs 310.9 g. (430 ml.) and 1.6% of this passed the 200 mesh screen while the remaining 98.4% is 50 x 200 mesh. This 50 x 200 mesh material gives 13.2% overhead in 24 hrs. in the standard attrition resistance test. A 150 ml. portion of the 50 x 200 mesh material is treated with 8.7 g. of arsenic trioxide in a Vycor reactor and tested in the synthesis of acrylic acid as described in Example 3. It gives only a trace of acrylic acid in a 2 hr. run.

EXAMPLE 2

The Davison grade 62 silica support described above is used to prepare a material having a calculated composition of 9.5% $Nb_2O_5$, 20.5% $MoO_3$, and 70% $SiO_2$. The resulting material is loaded in a small, stainless steel, fluid-bed reactor, treated with arsenic trioxide, and tested in the oxidation of propylene. To prepare the $Nb_2O_5$-$MoO_3$-$SiO_2$, a quantity of 45.3 g. of ammonium heptamolybdate (B&A, 81–83% $MoO_3$) is dissolved in 313 ml. of distilled water and added to 128.4 g. (125 g. on a dry basis) of the silica in a large Coors evaporating dish while stirring vigorously with a spatula. This amount of solution barely wets the silica. After stirring 15 minutes, the material is placed on a hot plate and heated to 110° C. in 40 minutes while stirring continuously. This gives a dry appearing white material. After cooling, this white material is treated with 196.2 g. of aqueous niobium oxalate solution containing 16.8% of $Nb_2O_5$. The material turns a pale green color. After 35 minutes soaking, the material is dried on a hot plate as before with the temperature reaching 170° C. in 25 minutes. At this point the resulting blue material is transferred to a muffle furnace and calcined 2 hours at 250° C. and then 2 hours at 450° C. to give 171.2 g. (400 ml.) of light green material. The material is then sized between U.S. Standard Sieves 60 and 200 and 164.3 g. (96%) is in this size range while the remaining material passes the 200 screen. In the standard attrition resistance test, 14.4% of this material passes overhead in 24 hours. Next, a quantity of 59.4 g. (150 ml.) is treated with 6 g. $As_2O_3$ in a small stainless steel reactor and then tested with a feed of 228 ml. propylene, 1369 ml. air and 228 ml. steam per minute at a temperature of 400° C. The resulting contact time is 2 seconds. Arsenic trioxide vapor is fed to the reactor at a rate of 2 g. per day. In a period of 414 hours running time, acrylic acid is obtained in conversions of 17–26%, and yields of 45–61% while the conversions to acetic acid are 5–18% at yields of 13–18%. After 177 hours of running time, the catalyst is treated in air at 450° C. for 6 hours and this appears to have a small, beneficial effect on catalyst activity.

EXAMPLE 3

60/70 Silica-alumina (similar to Davison Microspheroidal silica-alumina described above) is used to prepare a material having a calculated composition of 8.9% $Nb_2O_5$, 19.3% $MoO_3$, and 71.8% $SiO_2-Al_2O_3$. Treatment of this material with $As_2O_3$ forms the catalyst. First, a quantity of 186.2 g. (155 g. on a dry basis) of the $SiO_2-Al_2O_3$ sized between U.S. Standard Sieves 80 and 200 is impregnated in a Coors evaportaing dish with an aqueous solution containing niobium and molybdenum oxalates equivalent to 9.6 g. of $Nb_2O_5$ and 20.8 g. of $MoO_3$. After stirring thoroughly and soaking at room temperature 1 hour, the material is heated to 150° C. in 30 minutes on a hot plate while continuously stirring it with a porcelain spatula. This impregnation and drying process is repeated with a second 216 ml. portion of the mixed oxalate solution. This time the catalyst is heated to 200° C. In the attrition resistance test, this catalyst gives 8.9% overhead in 24 hours.

Next, a quantity of 139.8 g. (150 ml.) of this material is placed in a Vycor glass, fluid-bed reactor and dried at 400° C. by fluidizing in air 2 hours. The material is cooled to 200° C., 13.6 g. of $As_2O_3$ powder is added and fluidization with air is continued for 2 hours. After this pretreatment, the catalyst is tested in the oxidation of propylene in the following six successive 1-hour runs at a contact time of 2.2 seconds, and a molar feed ratio of 1 mole of propylene: 7.3 moles of air: 3 moles of water. A quantity of 13.65 g. of additional $As_2O_3$ is added between runs 2 and 3 and 6.8 g. is added between runs 3 and 4.

| Run | Temp., °C. | Percent conv. | | Percent yield | |
|---|---|---|---|---|---|
| | | Acetic | Acrylic | Acetic | Acrylic |
| 1 | 400 | 6.0 | 1.7 | 19.4 | 5.5 |
| 2 | 400 | 5.4 | 3.2 | 19.4 | 10.5 |
| 3 | 400 | 5.0 | 10.2 | 22.6 | 46.1 |
| 4 | 400 | 3.5 | 10.3 | 20.9 | 60.9 |
| 5 | 400 | 3.7 | 10.4 | 19.4 | 54.2 |
| 6 | 425 | 4.6 | 11.2 | 19.6 | 17.2 |

A quantity of 3.95 g. of arsenic trioxide is fed to the reactor from a vaporizer at 170° C. during these six runs.

EXAMPLE 4

A material having the same calculated composition as the catalyst of Example 2 is prepared from Davison grade 56 granular silica, described above, and an aqueous solution containing niobium and molybdenum oxalates by a two-step impregnation process. Thus, 158.5 ml. of the solution equivalent to 8.5 g. of $Nb_2O_5$ and 18.3 g. of $MoO_3$ is poured onto 139.2 g. (408 ml., 125 g. on a dry basis) of the support sized between U.S. Standard Sieves 80 and 200 in a Coors evaporating dish. This amount of solution barely wets the silica. The material is stirred 15 minutes with a porcelain spatula and then heated and stirred on a hot plate until the temperature rises to 110° C. After cooling, the light blue material is treated with a second 158.5 ml. portion of this mixed oxalate solution, soaked 30 minutes at room temperature, and again heated on a hot plate, this time to 150° C. The resulting dark blue material is calcined 3 hr. at 250° C., and then 2 hr. at 450° C. to give 178.2 g. (342 ml.) of light green material. On screening, 96.5% is found to be between U.S. Standard Sieves 80 and 200. This size material gives 28% overhead in 24 hr. in the attrition resistance test. Next, a quantity of 68.2 g. (150 ml.) is treated with 7 g. $As_2O_3$ and tested as described for the catalyst of Example 2 for 81 hr. During this time, acrylic is obtained from propylene at 21–24% conversions and 42–60% yields while acetic acid is obtained at a conversion of 7% and 13–19% yields. The used catalyst gives 29.2% overhead in 24 hr. in the attrition resistance test.

EXAMPLE 5

Davison granular SMR 7–1032A silica is used to prepare a $Nb_2O_5$-$MoO_3$-$SiO_2$ material of the same composition as that of Example 2 for use with arsenic trioxide in the synthesis of acrylic acid from propylene. The method of preparation of the $Nb_2O_5$-$MoO_3$-$SiO_2$ is different in this case. A quantity of 36.7 g. of $MoO_3$ is carefully dissolved in an ammonium hydroxide solution prepared from 36 ml. of distilled water and 15 ml. of 28% aqueous ammonium hydroxide by heating on a steam bath. The resulting solution is mixed with 180 ml. of aqueous niobium oxalate solution (equivalent to 16.8 g. of $Nb_2O_5$) to give 237 ml. of solution. This solution is added to 139 g. (453 ml., 125 g. on dry basis) of the 80 x 150 mesh silica in a glass dish, soaked 1 hr., dried on a steam bath 1 hr. and 40 minutes with frequent stirring, and then dried 15 hr. in a 120° C. oven. Next, the material is calcined 3 hr. at 250° C. and 2 hr. at 450° C. to give 171.7 g. (446 ml.) of light green material. In the attrition resistance test, this material gives 41% overhead in 24 hr.

A quantity of 150 ml. (55.5 g.) of this $Nb_2O_5$-$MoO_3$-$SiO_2$ material is treated with 7 g. of arsenic trioxide and tested 39 hr. in a stainless steel reactor as described in Example 2. During this time, acrylic acid is obtained in conversions of 14–18% and yields of 45–59% based on propylene while the conversions to acetic acid are 3–5% at yields of 11–12%. Similar results are obtained in a total of 3.5 hr. running time using a second portion of the $Nb_2O_5$-$MoO_3$-$SiO_2$ material in a glass reactor.

After 3.5 hr. use in the glass reactor, the catalyst gives 5.4% overhead in 24 hr. in the standard attrition resistance test.

EXAMPLE 6

Davison granular SMR 7–1032A silica is used to prepare a catalyst having the calculated composition of 5% $As_2O_3$, 9.5% $Nb_2O$-, 20.57 $MoO_3$ and 65% $SiO_2$ for use in the synthesis of acrylic acid from propylene. A quantity of 92 g. (300 ml., 82.6 g. on a dry basis) of the silica is mixed with 6.35 g. of arsenic trioxide powder and fluidized overnight at 200° C. in a fluid-bed reactor made of glass. A quantity of 78.7 g. of the resulting material (82.7 g. is obtained after mechanical losses) is treated with 150 ml. of a solution containing 23.1 g.

MoO₃ and 10.7 g. of Nb₂O₅ prepared as described in Example 5. After soaking 1 hr., the material is dried and calcined as described in Example 5 to give 112 g. (232 ml.) of gray catalyst. A quantity of 150 ml. (62.9 g.) of this material is tested 1.5 hr. in a small glass reactor. The feed consists of 1 mole propylene: 6 moles air: 1 mole steam in addition to a small amount of arsenic trioxide vapor. A contact time of 1 second is used. Acrylic acid is obtained at a conversion of 10% and a yield of 50% based on propylene while acetic acid is obtained at 2% conversion and an 8% yield. Reaction temperature is 400° C.

The used catalyst gives 8.9% overhead in 24 hr. in the standard attrition resistance test.

EXAMPLE 7

Davison grade 56 silica is used to prepare a catalyst from the same materials and having the same composition as the catalyst in Example 4. In this preparation, the silica is impregnated with an aqueous solution of ammonium heptamolybdate, dried, and then impregnated with an aqueous solution of niobium oxalate and dried. Except for the difference in impregnation technique, this catalyst is prepared as described for the catalyst of Example 4. After calcination, 172.3 g. of light green material is obtained. Of this amount, 163 g. (400 ml.) of material is between U.S. Standard Sieves 80 and 200 and the remaining passed the 200 mesh sieve.

In the standard attrition resistance test, 39.6% of the material passes overhead in 24 hrs. On testing 150 ml. (63.9 g.) with 7 g. of added arsenic trioxide for 83 hrs. as described in Example 2, acrylic acid is obtained in 20–29% conversions at 46–61% yields based on propylene. Acetic acid is obtained in 2.7% conversions and 7–15% yields on this same basis.

EXAMPLE 8

The catalyst preparation described in Example 7 is repeated using Davison grade 56 silica again. In the standard attrition resistance test, this batch of material gives 33.6% overhead in 24 hrs.

A quantity of 150 ml. (55 g.) of this material is treated with 7 g. of arsenic trioxide in a small, stainless steel, fluid-bed reactor and tested in the synthesis of acrylic acid from propylene for a total of 621 hrs. Arsenic trioxide is fed to the reactor at a rate of 2 g. per day except for the 8-hr. activation period. This attempted activation is at the end of run 4 and consists of heating the catalyst at 450° C. while fluidizing it in air. All of the runs are made 400° C. except run 3 which was at 380° C. The following table summarizes the results of the successive runs:

| Run | Contact time, sec. | Mole propylene: air: steam | Acrylic acid | | Acetic acid | |
|---|---|---|---|---|---|---|
| | | | Percent conv. | Percent yield | Percent conv. | Percent yield |
| 1 (181 hr.) | 2 | 1:6:1 | 18–23 | 39–62 | 5–6 | 9–16 |
| 2 (148 hr.) | 3 | 1:6:1 | 21–22 | 45–52 | 5–7 | 12–14 |
| 3 (44 hr.) | 3 | 1:6:1 | 17–18 | 34–48 | 5 | 10–14 |
| 4 (160 hr.) | 2 | 1:6:1 | 17–23 | 46–55 | 4–5 | 11–14 |
| 5 (53 hr.) | 2 | 1:6:1 | 18–19 | 49–55 | 4–5 | 12–14 |
| 6 (35 hr.) | 2 | 1:5:1 | 17–18 | 49–56 | 4 | 12–13 |

Note that ranges of conversions and yields are given.

EXAMPLE 9

Davison grade 952 silica support (also known as MSID spray-dried, fluid-bed silica gel) is used to prepare a Nb₂O₅-MoO₃-SiO₂ material of the same composition as that of Example 2 for use with arsenic trioxide in the synthesis of acrylic acid from propylene. A quantity of 24.7 g. of MoO₃ is carefully dissolved in an ammonium hydroxide solution prepared from 100 ml. of distilled water and 14 ml. of 28% aqueous ammonium hydroxide by heating on a steam bath. The resulting solution is diluted to 300 ml. with distilled water and added to 89 g. (84.5 g. on a dry basis) of the 80 x 200 mesh silica in a glass dish, stirred and soaked 20 minutes and heated to 110° C. on a hot plate in 30 minutes with continuous stirring. It is removed from the hot plate, cooled, treated with 275 ml. of dilute niobium oxalate solution (equivalent to 11.5 g. Nb₂O₅) and dried 3.5 hrs. on a steam bath. Final drying and calcination is 12 hrs. at 120° C., 3 hrs. at 250° C., and 2 hrs. at 450° C. The resulting yellowish green material weighs 114 g., and 90% of it is between U.S. Standard Sieves 80 and 200 in size.

In the attrition resistance test, 40 g. of the material gives 48% overhead in 24 hrs.

A quantity of 50.4 g. (150 ml.) is treated with 7 g. of arsenic trioxide in a stainless steel reactor and tested in the synthesis of acrylic acid 43 hrs. as described for the catalyst of Example 1. Acrylic acid is obtained in 10–14% conversion based on propylene fed while the yields are 44–54%. On this same basic acetic acid is obtained in 2% conversion and 9–11% yields.

EXAMPLE 10

A new 150 ml. portion of the catalyst of Example 2 is treated with 6 g. As₂O₃ in a small, glass, fluid-bed reactor and tested 8 hrs. in the synthesis of acrylonitrile from propylene, air and ammonia. The tests are at a temperature of 460° C., a contact time of 3.5 seconds, and a feed ratio of 1 mole of propylene: 6 moles of air: 0.8 mole of ammonia: 1 mole of steam. Based on propylene, a conversion of 52% to acrylonitrile is obtained at a 74% yield. Based on ammonia, a conversion of 65% to acrylonitrile is obtained at a 72% yield. A trace of acetonirtile is also produced.

EXAMPLE 11

The Davison grade 62 silica support is used to prepare a material having a calculated composition of 8.3% Ta₂O₅, 24.9% MoO₃, and 66.8% SiO₂ for use in the synthesis of acrylic acid from propylene and air. To prepare the Ta₂O₅-MoO₃-SiO₂ material, a quantity of 57.7 g. of ammonium heptamolybdate (B & A, 81–83% MoO₃) is dissolved in 313 ml. of distilled water and added to 128.4 g. (125 g. on a dry basis) of silica in a large Coors evaporating dish while stirring vigorously with a spatula. This amount of solution barely wet the silica. After stirring 15 minutes, the material is placed on a hot plate and heated to 110° C. in 40 minutes while stirring continuously. This gives a dry appearing, white material. After cooling, this white material is treated with 200 ml. of aqueous tantalum oxalate containing 15.6 g. of Ta₂O₅. After soaking 0.5 hr., the material is dried on a hot plate as before so that the temperature reaches 150° C. in 0.5 hr. Next, the material is transferred to a muffle furnace and calcined 3 hrs. at 250° C. and then 2 hrs. at 450° C. The resulting material weighs 175 g., and 95% of it is between U.S. Standard Sieves 60 and 200. In the standard attrition resistance test, 15% of the material passes overhead in 24 hrs. Next, a quantity of 60 g. (150 ml.) is treated with 6 g. of arsenic trioxide in the small, glass, fluid-bed reactor and is tested at 400° C. and 3.5 seconds contact time using a feed ratio of 1 mole of propylene: 7.5 moles of air: 3 moles of steam. In 8 hrs., 22% of the propylene fed is converted to acrylic acid at a 55% yield. At the same time, a 5% conversion to acetic acid at 12% yield is obtained based on the propylene fed.

EXAMPLE 12

Davison grade 70 silica (identical to grade 62 except for particle size) sized between U.S. Standard Sieves 30 and 60 is used to prepare a material having a calculated composition of 9.5% $Nb_2O_5$, 20.5 $MoO_3$ and 70% silica as described in Example 2. A volume of 10 ml. (3.9 g.) is charged to a 1.6 cm. I.D. Pyrex fixed-bed reactor which is fitted with a 0.9 cm. O.D. thermowell. The catalyst is treated with 10% of its weight of $As_2O_3$ at elevated temperature and then tested. The activity is initially somewhat low, but increases with a few hours use. At 400° C., 2.3 seconds contact time, and a feed stream comprising 1 mole of propylene: 7.5 moles air: 3 moles of steam, the conversion to acrylic acid is 35% and the yield is 60%. The conversion to acetic acid is 10% at a yield of 20%.

The invention has been described in detail with particular reference to prefered embodiments thereof, but it will be understood that variations and modifications can be effected within the spirit and scope of the invention.

We claim:

1. A process for the conversion of propylene to acrylonitrile which comprises contacting a vapor-phase mixture containing ammonia, oxygen and propylene with a catalyst consisting essentially of about:

| | Percent by weight |
|---|---|
| $MoO_3$ | 5–75 |
| $Nb_2O_5$ and/or $Ta_2O_5$ | 2–50 |
| $As_2O_3$ | 0–25 |
| Support | 50–90 | said support being a microporous, solid inorganic support having a major portion of its pores of about 80 A. to about 280 A. in diameter.

2. The process of claim 1 wherein the catalyst consists essentially of about:

| | Percent by weight |
|---|---|
| $MoO_3$ | 10–40 |
| $Nb_2O_5$ and/or $Ta_2O_5$ | 5–30 |
| $As_2O_3$ | 5–15 |
| Support | 50–80 |

3. The process of claim 1 wherein the support has a major portion of its pores of about 120 A. to about 180 A. in diameter.

4. The process of claim 1 in which said porous support is selected from silica and silica-alumina, and a major portion of said pores are about 100 A. to about 200 A. in diameter.

5. The process of claim 2 in which said porous support is selected from silica and silica-alumina, and a major portion of said pores are about 100 A. to 200 A. in diameter.

References Cited

UNITED STATES PATENTS

| | | | |
|---|---|---|---|
| 3,173,957 | 3/1965 | McDaniel et al. | 260—465.3 XR |
| 3,282,860 | 11/1966 | McDaniel et al. | 260—465.3 XR |
| 3,347,899 | 10/1967 | Caporali et al. | 260—465.3 |
| 3,338,952 | 8/1967 | Callahan et al. | 260—465.3 |

JOSEPH P. BRUST, Primary Examiner

U.S. Cl. X.R.

260—533; 252—455, 456

PO-1050
(5/69)

UNITED STATES PATENT OFFICE
CERTIFICATE OF CORRECTION

Patent No. 3,525,101     Dated August 18, 1970

Inventor(s) Howard S. Young; Jefferson W. Reynolds

It is certified that error appears in the above-identified patent and that said Letters Patent are hereby corrected as shown below:

Column 1, line 56, "surprising" should read -- surprisingly --.

Column 5, line 61, "usuable" should read -- usable --.

Column 6, line 57, "heat" should read -- head --.

Column 7, line 47, "in" should read -- is --.

Column 8, line 26, "compounds" should read -- components --.

Column 9, line 71, in the Table under the heading "Percent Yield Acrylic", "17.2" should read -- 47.2 --.

Column 10, line 25, after "acrylic" insert -- acid --.

Column 10, line 68, "Nb$_2$O-" should read -- Nb$_2$O$_5$ --; and "20.57" should read -- 20.5% --.

Column 11, line 50, after "made" insert -- at --.

Column 13, line 1, "20.5" should read -- 20.5% --.

SIGNED AND
SEALED
MAR 2 1971

(SEAL)
Attest:

Edward M. Fletcher, Jr.
Attesting Officer

WILLIAM E. SCHUYLER, JR.
Commissioner of Patents